United States Patent
Huth et al.

(10) Patent No.: US 11,303,179 B2
(45) Date of Patent: Apr. 12, 2022

(54) STATOR OF A ROTATING FIELD MACHINE

(71) Applicant: ebm-papst Mulfingen GmbH & Co. KG, Mulfingen (DE)

(72) Inventors: Gerhard Huth, Hohenroth-Leutershausen (DE); Jiawei He, Kaiserslautern (DE); Jens Krotsch, Niederstetten (DE); Roland Erneker, Künzelsau-Amrichhausen (DE); Otmar Hügel, Künzelsau (DE); Walter Hofmann, Mulfingen-Ailringen (DE)

(73) Assignee: ebm-papst Mulfingen GmbH & Co. KG, Mulfingen (DE)

( * ) Notice: Subject to any disclaimer, the term of this patent is extended or adjusted under 35 U.S.C. 154(b) by 713 days.

(21) Appl. No.: 16/319,122

(22) PCT Filed: Jul. 18, 2017

(86) PCT No.: PCT/EP2017/068097
§ 371 (c)(1),
(2) Date: Jan. 18, 2019

(87) PCT Pub. No.: WO2018/015372
PCT Pub. Date: Jan. 25, 2018

(65) Prior Publication Data
US 2022/0021263 A1    Jan. 20, 2022

(30) Foreign Application Priority Data
Jul. 21, 2016   (DE) .................... 10 2016 113 436.8

(51) Int. Cl.
*H02K 3/47*      (2006.01)
*H02K 21/14*     (2006.01)
*H02K 15/06*     (2006.01)

(52) U.S. Cl.
CPC ............. *H02K 3/47* (2013.01); *H02K 15/061* (2013.01); *H02K 21/14* (2013.01)

(58) Field of Classification Search
CPC ......... H02K 3/47; H02K 15/061; H02K 21/14
See application file for complete search history.

(56) References Cited

U.S. PATENT DOCUMENTS

| 2,607,816 | A | * | 8/1952 | Ryder | ............ | H02K 1/148 |
| | | | | | | 310/216.086 |
| 4,602,423 | A | * | 7/1986 | Ulrich | ............ | H02K 1/12 |
| | | | | | | 29/596 |
| 2011/0210633 | A1 | * | 9/2011 | Lu | ............ | H02K 1/148 |
| | | | | | | 310/114 |

FOREIGN PATENT DOCUMENTS

| DE | 2434347 | 1/1976 |
| DE | 2644279 | 11/1980 |

(Continued)

OTHER PUBLICATIONS

International Search Report dated Jun. 3, 2019.

*Primary Examiner* — Naishadh N Desai
(74) *Attorney, Agent, or Firm* — Dickinson Wright PLLC

(57) ABSTRACT

The invention relates to a stator active part for an electric motor, preferably a permanent-magnet-excited synchronous machine consisting of a hollow-cylindrical yoke, comprising an inner cladding and having a receptacle space, into which a coil support is inserted, wherein the coil support consists of a peripherally-closed, hollow-cylindrical tubular body extending in the axial direction (A) of the yoke, on the outer cladding of said body a plurality of coil holders being formed, wherein a finely-distributed coil is installed on each coil holder.

11 Claims, 3 Drawing Sheets

(56) References Cited

FOREIGN PATENT DOCUMENTS

| | | | | |
|---|---|---|---|---|
| EP | 1766756 | B1 | 10/2018 | |
| JP | 2007053867 | A * | 3/2007 | ........... H02K 15/061 |
| WO | WO2005/043714 | A2 | 5/2005 | |

* cited by examiner

STATOR OF A ROTATING FIELD MACHINE

RELATED APPLICATIONS

This application claims priority to German Patent Application No. 10 2016 113 436.8, filed on Jul. 21, 2016 and PCT/EP2017/068098, filed Jul. 18, 2017.

FIELD

The present disclosure relates to a stator active part of a rotating field machine, in particular an electric motor.

BACKGROUND

A variety of electric motors having greatly varying embodiments of stators and stator packets with windings are known in the prior art. Thus, for example, in the case of brushless DC motors (BLDC motors), the so-called air gap winding having freestanding winding bodies is known.

The winding for such a winding body is typically firstly applied to a mandrel, which supports the coils during the winding procedure and keeps them in position. The winding, which typically consists of self-bonding wire, is then brought by heating and compression into its final shape, which the winding body maintains after the heating. The winding body is subsequently demolded from the mandrel and can be further processed.

So-called segmented stator coils are frequently also used in the coils. These are used if a high number of turns is also required in addition to the requirements of the high filling factor and the orthocyclic winding linked thereto. They can preferably be produced using the flyer winding technique and also using the linear winding technique.

Typical embodiments are T-segments and plugged coils. Plugged toothed coils are frequently used in the case of a star-shaped stator design, in which a yoke is installed after the installation of the coils. Internally-slotted full plate cuts may also be provided with plugged toothed coils. Alternatively, chained poles are used, which combine the advantages of the low number of contacts of the needle-wound full plate cut with the filling factor advantages of the linear-wound single tooth.

Small permanent-magnet-excited (PM) synchronous motors are increasingly being used in high-speed drives. These include, for example, high-speed compressor, screwdriver, or textile spindle drives. Because of the high piece counts, these drives are subject to a high cost pressure. The goal is therefore to develop a motor concept which enables the simplest possible and automatable manufacturing technology.

Because of the high speeds, a slender "drum rotor configuration" is desirable, wherein in addition to the permanent magnets, the stator substantially influences the costs of such drives.

Presently, the stator active part is embodied using a stator plate packet, which is stacked from stamped plates and is made into a packet, for example, by self-bonding. Alternatively thereto, it is also possible to combine the stamping process and packet forming in the form of so-called stamping packet forming. Subsequently, the stator sheet metal packet is wound with a rotating field winding, connected, and impregnated. In this embodiment, the rotating field winding lies in the slots of the stator plate packet and can be embodied as a distributed winding or as a toothed coil winding.

In PM synchronous motors having air gap winding, the stator plate packet consists solely of a stator yoke and the rotary field winding is located as finely-distributed winding directly between stator yoke and rotor in the air gap. In order that a winding head which protrudes above the stator yoke does not result in this case, the air gap winding is embodied as a so-called skew winding. Different winding variants exist for this purpose.

Such skew windings have the disadvantage of the fact that the winding volume only partially participates in the torque formation, however, and the base field winding factor resulting therefrom is in the order of magnitude between 50 and 60%.

To avoid these disadvantages, unskewed multilayer windings are known in the prior art, in which the winding structure is accompanied by broad overlap regions of the strands in the winding head region and also corresponding yoke packet excesses. The disadvantage in this case is that a costly and complex phase insulation becomes necessary.

It is therefore the object of the present disclosure is to overcome the above-mentioned disadvantages and to provide a stator active part for an electric motor, preferably a permanently-excited synchronous machine, which is simple and cost-effective to install, and also an improved and cost-effective method for producing a stator active part.

BRIEF SUMMARY

This object is achieved by the combination of features according to patent claim 1 and a method having the features of claim 10.

To achieve the above-mentioned object, it is proposed that a stator active part of the PM synchronous motor made of a yoke packet, which bears the air gap winding in the interior, be provided, wherein the yoke packet preferably consists of stamped electrical steel plates or sintered SMC material, and also a specifically formed coil support, in the hollow-cylindrical interior of which a rotor is attachable in a drive-active manner.

It is furthermore provided according to the invention that the preferably three-strand air gap winding is implemented without overlap in the winding head region by executing a finely-distributed winding similarly to the toothed coil technique.

The air gap winding in the form according to the invention is preferably introduced unskewed into the yoke packet and does not have phase overlaps in the winding head region, so that a comparatively simple insulation system can be used. In a general embodiment of the invention, the stator consists of N coils, wherein N/3 coils are used per strand in three-strand stators, in the present case finely-distributed coils in each case. With, for example, N=6, two finely-distributed coils would be used per strand.

The present disclosure will be explained in greater detail hereafter on the basis of the above-mentioned example having N=6 and thus N/3=2 finely-distributed coils as a coil pair, wherein the invention is applicable to other numbers of coils, thus, for example, in the three-strand variant to N=3, 6, 9, 12, . . . coils.

According to the present disclosure, a stator active part for an electric motor, preferably a permanently-excited synchronous machine, is therefore proposed, consisting of a hollow-cylindrical yoke having an inner cladding comprising a receptacle space, into which a coil support is inserted, wherein the coil support consists of a peripherally-closed hollow-cylindrical tubular body extending in the axial direction of the yoke, on the outer cladding of which body a plurality of N coil holders is formed, wherein a finely-distributed coil, which is wound in air gap winding technique of a winding strand made of two coils is installed on each coil holder of a pair of coil holders.

In one preferred embodiment of the invention, it is provided that the windings of the coils of each winding strand are embodied without winding overlap regions in the winding head region.

An embodiment is also advantageous in which the coil holders are formed as web-shaped holders, which extend along the axial direction A of the tubular body and bear with the radially outer web edge thereof against the inner cladding or against an inner cladding section of the yoke.

In a further preferred embodiment of the invention, it is provided that the coil holders are formed as hollow-profile-shaped coil holders, which extend along the axial direction A of the tubular body with a receptacle space for receiving an inlay and bear with the radially outer chamber wall thereof against the inner cladding or against an inner cladding section of the yoke. For flux guiding and increasing the active part utilization, it is therefore advisable to integrate so-called SMC inlays into the web regions of the coil support. In the simplest case, this can be carried out in the form of SMC blocks, which are extruded directly during the production of the coil support or which are inserted into inlay pockets, which are formed as hollow profiles and embodied in a matching manner in the coil support.

To suppress interfering parasitic effects, for example, interfering cogging torques, it is advantageous if the SMC inlays are not embodied as block s-shaped but rather as tooth-shaped having a wider tooth base. It is preferable if the cross-sectional shape of the hollow-profile-shaped coil holders is accordingly rectangular or tooth-shaped, wherein other geometrically suitable shapes can also be formed.

In one particularly preferred embodiment of the invention, it is provided that an insertable inlay, in particular an insertable SMC inlay, is provided in the receptacle space or in each of the receptacle spaces of the hollow-profile-shaped coil holders, so that SMC materials especially adapted for this purpose can be used for this purpose depending on the requirement.

The end faces of the SMC inlays are advantageously electrically insulated and depending on the production method are either completely enclosed by plastic (in the case of extrusion coating with plastic) or by additional measures in relation to the toothed coils applied to the coil supports (in the case of the insertion or pressing in of the inlays).

The cross-sectional shape of the inlays is preferably formed corresponding to the respective cross-sectional shape of the hollow-profileshaped coil holder, which is producible by means of extrusion in a cost-effective manner.

Furthermore, recesses or positioning ribs for the rotationally-fixed positioning of the coil support can also be provided on or in the inner cladding of the yoke, on which or in which the coil holders of the coil support at least partially bear or engage.

A further aspect of the present invention relates to the method according to the invention for producing an above-described stator active part, comprising the following steps:
a. providing a hollow-cylindrical yoke having a receptacle space;
b. providing a coil support for N coils, which has N/P coil holders per motor phase P, which protrude radially outward from the coil support;
c. winding finely-distributed coils for each motor phase P from a winding wire;
d. installing the wound coils on the coil holders, so that the windings of the coils of each winding strand are embodied without winding overlap regions in the winding head region; and
e. inserting the coil support together with the installed coils into the receptacle space of the yoke.

In one advantageous refinement of the method, it is provided that the yoke is provided on or in the inner cladding of the yoke with recesses or positioning ribs for the rotationally-fixed positioning of the coil support and the coil support having the coil holders is installed in the receptacle space of the yoke in such a way that the coil holders at least partially bear against the recesses or positioning ribs or engage therein, preferably in a formfitting manner.

In one particularly preferred embodiment of the method, it is provided that an inlay, in particular an SMC inlay, is introduced into the respective receptacle spaces of the hollow-profile-shaped coil holders, either already during the production of the coil support or later.

Other advantageous refinements of the invention are characterized in the dependent claims and/or are described in greater detail hereafter together with the description of the preferred embodiment of the invention on the basis of the figures. Thus, the potting of the stator using a potting compound can be performed as a further work step.

DETAILED DESCRIPTION

The invention will be described in greater detail hereafter on the basis of exemplary embodiments with reference to FIGS. 1 to 5, wherein identical reference signs indicate identical functional and/or structural features.

The exemplary embodiments of the figures share the feature of a stator active part 1 for an electric motor, preferably a permanent-magnet-excited synchronous machine consisting of a hollow-cylindrical yoke 10 having a receptacle space 11. The receptacle space 11 is enclosed by an inner cladding 12.

Figure 1:
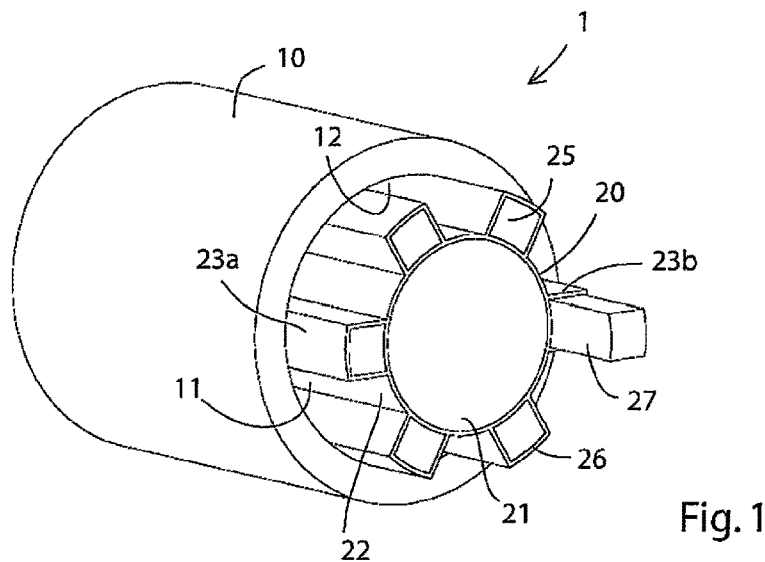
FIG. 1 shows a perspective view of an exemplary embodiment of a stator active part.

A coil support 20 is shown only partially inserted into the receptacle space 11 in FIG. 1. The coil support 20 consists of a peripherally-closed hollow-cylindrical tubular body 21 extending in the axial direction A of the yoke 10, which body forms the base of the coil support. The tubular body 21 of this exemplary embodiment forms an outer cladding 22, from which each of a plurality of diametrically opposing pairs of two coil holders 23a, 23b are formed.

In a simple embodiment (not shown), these coil holders 23a, 23b are formed as webs protruding radially outward, which protrude in the inserted state of the coil support 20 up to the inner cladding 12 of the yoke 10.

A finely-distributed coil 30 wound in toothed coil technique is installed on each coil holder 23a, 23b.

Figure 6:
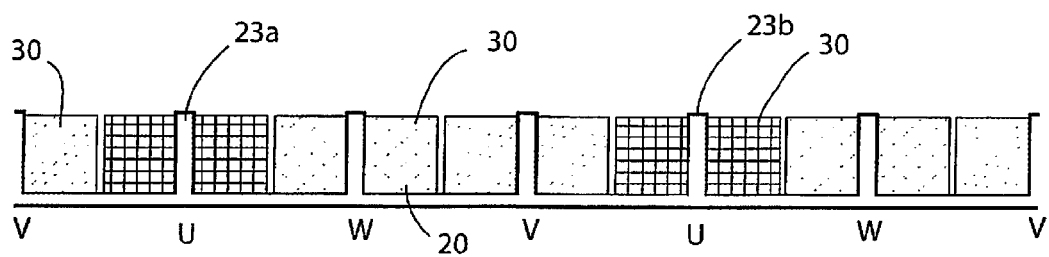
FIG. 6 shows a schematic view of winding up of a coil support with coils.
Figure 7:
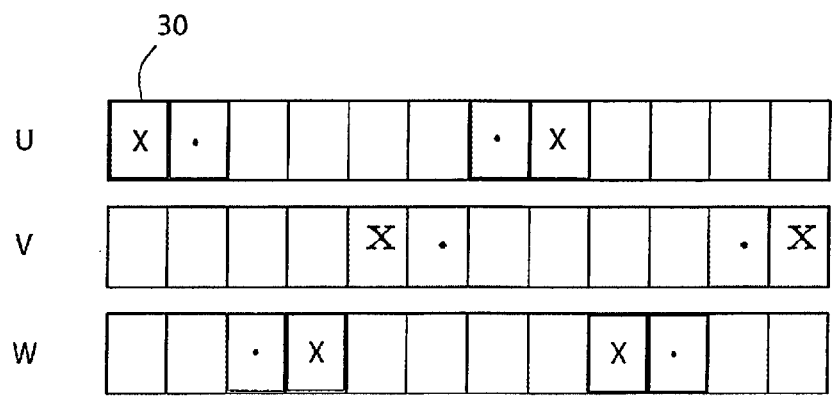
FIG. 7 shows a zone plan of a, for example, two-pole air gap winding for three winding strands.

FIG. 6 shows a schematic view of winding up of a coil support 20 with coils 30 for three winding strands U, V, W and FIG. 7 shows a zone plan of a two-pole air gap winding for the three winding strands. The winding direction of the coils results from the symbols "X" and "point", wherein the zone plan is indicated for the entire peripheral angle of 360° (or 2π). As can be seen from the zone plan, two coils 30 are associated in each case with the diametrically opposing coil holders 23a, 23b of a pair of coil holders 23a, 23b.

The coils 30 of each winding strand U, V, W are executed in this manner in the winding head region without coil overlap regions.

The coil holders 23a, 23b of the five exemplary embodiments shown are each arranged diametrically opposing on the tubular body 21 and/or formed integrally therewith and extend radially outward in the direction toward the inner cladding 12 of the yoke 10, to bear there against the inner cladding 12.

The coil holders 23a, 23b are formed as hollow-profile-shaped coil holders and extend along the axial direction A of the tubular body 2. The coil holders 23a, 23b are formed having a receptacle space 25 for receiving an inlay 27. The inlays 27 can be inserted into the receptacle space 25 as shown in FIGS. 1 to 5 for an inlay 27.

The inlays 27 are designed as SMC inlays.

SMC inlays in the meaning of the present invention are inlays made of a SMC (soft magnetic composite) material, which is formed from a composite material made of atomized iron powder (FE powder), which are coated with thin insulation and binder layers. Furthermore, the SMC inlays are produced in an isotropic manner and have significantly lower eddy current losses at high frequencies than conventional electric steels.

Figure 2:
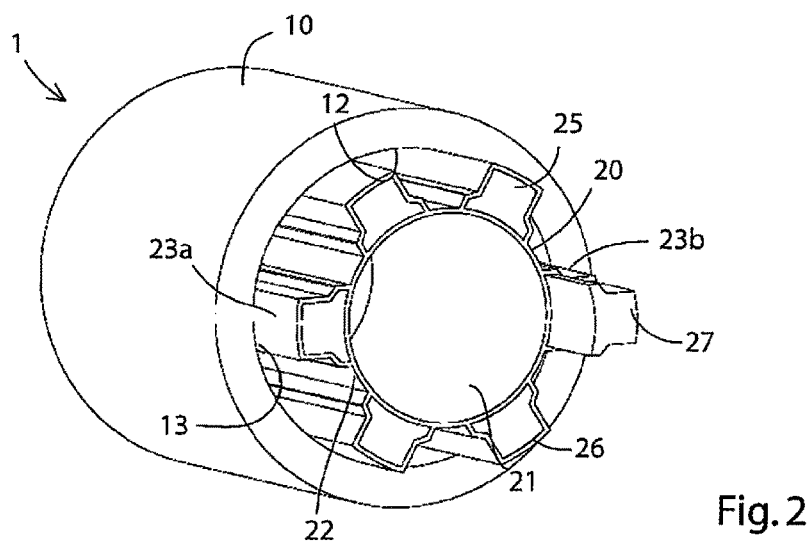
FIG. 2 shows a perspective view of a second exemplary embodiment of a stator active part.
Figure 3:
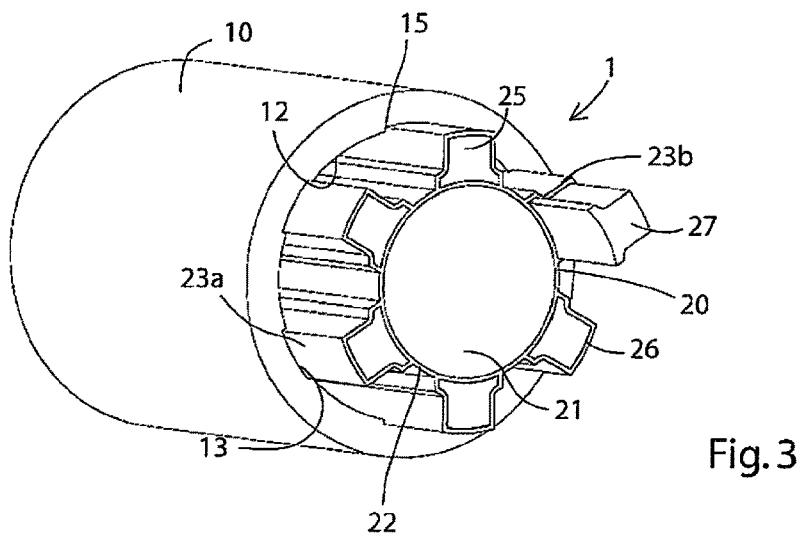
FIG. 3 shows a perspective view of a third exemplary embodiment of a stator active part.
Figure 4:
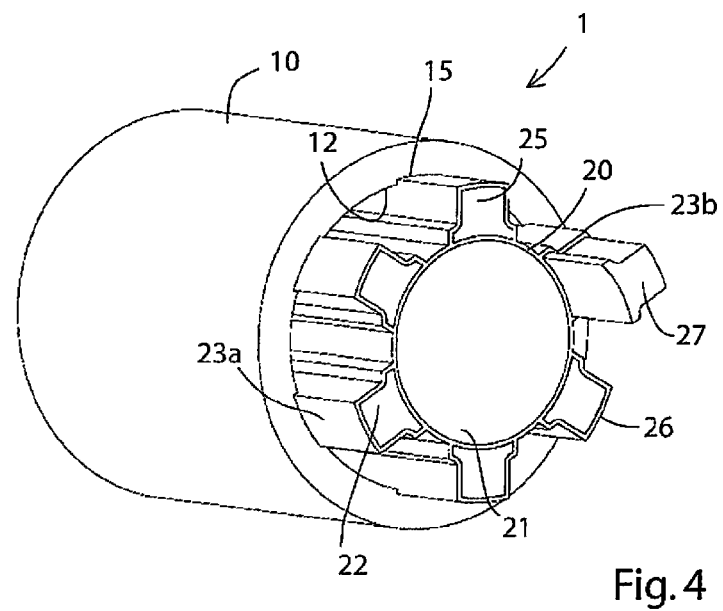
FIG. 4 shows a perspective view of a fourth exemplary embodiment of a stator active part.

In the embodiments according to FIGS. 1 to 3, radially outer chamber walls 26 delimit the respective receptacle space 25 of the coil holders 23a, 23b, which bear against the inner cladding 12, or, as shown in the embodiment of FIG. 3, against an inner cladding section 13 of the yoke 10 formed by a recess, respectively. Embodiments are shown in FIGS. 4 and 5, in which the radially outer chamber walls 26 were omitted and the inlays 27 bear directly against the inner cladding 12 of the yoke 10.

In FIG. 1, the cross-sectional shape of the hollow-profile-shaped coil holders 23a, 23b is rectangular, while in the embodiments according to FIGS. 2 to 5, the cross-sectional shape of the hollow-profile-shaped coil holders 23a, 23b is tooth-shaped having a widened base on the tubular body 21. As can be seen in the figures, the cross-sectional shape of the inlays 27 is formed corresponding to the respective cross-sectional shape of the hollow-profile-shaped coil holder 23a, 23b thereof.

Figure 5:
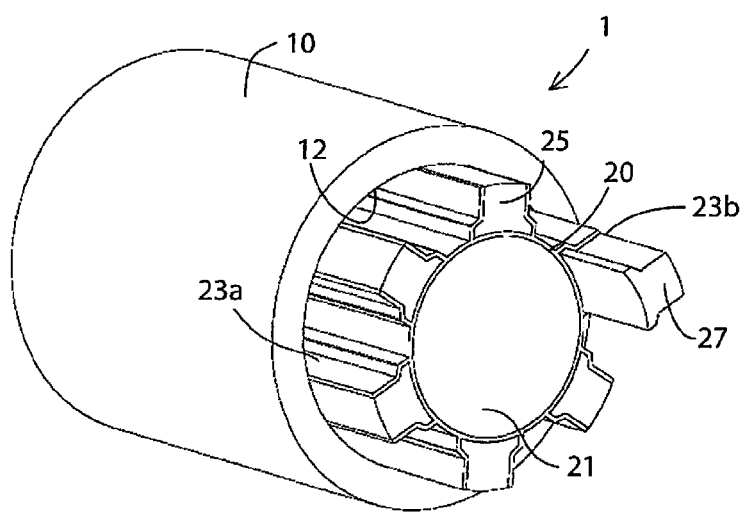
FIG. 5 shows a perspective view of a fifth exemplary embodiment of a stator active part.

In the embodiments according to FIGS. 3 and 5, a form fit is achieved in each case between recesses 15 in the yoke 10 and the coil holders 23a, 23b. For this purpose, recesses 15 are provided in the inner cladding 12 of the yoke 10 for the rotationally-fixed and accurately-located positioning of the coil support 20, into which the coil holders 23a, 23b of the coil support 20 at least partially protrude with the radially outer section thereof.

The installation according to this exemplary embodiment is carried out in such a way that prefinished finely-distributed coils 30, which are wound according to the zone plan of FIG. 7, for each motor phase U, V, W, which are wound from a winding wire, are installed on the coil holders 23a, 23b, so that the windings of the coils 30 of each winding strand are embodied in the winding head region without winding overlap regions. The coil support 20 is thereafter inserted together with the installed coils 30 into the receptacle space 11 of the yoke 10. The SMC inlays 27 are either formed by extrusion in the coil support 20 or are inserted into the receptacle spaces 25, as described above.

The stator is subsequently impregnated or potted or treated using another equivalent method.

The invention is not restricted in its embodiments to the preferred exemplary embodiments indicated above. Rather, a number of variants are conceivable, which make use of the solution described even in fundamentally differently designed embodiments.

The invention claimed is:

1. A stator active part for an electric motor having a number of P motor phases, preferably a permanent-magnet-excited synchronous machine consisting of a hollow-cylindrical yoke comprising an inner cladding and having a receptacle space into which a coil support is inserted, wherein the coil support consists of a peripherally-closed, hollow-cylindrical tubular body extending in the axial direction (A) of the yoke, on the outer jacket of said body a plurality of N coil holders being formed, wherein N/P finely-distributed coils wound in air gap winding technique are installed in each case on the coil holders per motor phase P and the coil holders bear against an inner cladding section of the yoke while forming receptacle spaces, wherein the coil holders are formed as hollow-profile-shaped coil holders, which extend along the axial direction (A) of the tubular body, having a receptacle space for receiving an inlay.

2. The stator active part as claimed in claim 1, wherein the windings of the coils of each winding strand for a motor phase P are embodied in the winding head region without winding overlap regions.

3. The stator active part as claimed in claim 1, wherein P=3 and N=6 is selected for a three-strand motor, and thus 2 finely-distributed coils per motor phase are wound onto the coil holders.

4. The stator active part as claimed in claim 3, wherein the coil holders of a pair of coil holders are each arranged diametrically opposing on the tubular body and extend radially outward in the direction toward the inner cladding of the yoke.

5. The stator active part as claimed in claim 1, wherein the coil holders bear with the radially outer chamber wall thereof against the inner cladding or against an inner cladding section of the yoke.

6. The stator active part as claimed in claim 5, wherein the cross-sectional shape of the hollow-profile-shaped coil holders is rectangular or tooth-shaped.

7. The stator active part as claimed in claim 5, wherein an SMC inlay, is inserted into the receptacle space or each of the receptacle spaces of the hollow-profile-shaped coil holders.

8. The stator active part as claimed in claim 5, wherein the cross-sectional shape of the inlays is formed corresponding to the respective cross-sectional shape of the hollow-profile-shaped coil holder into which the inlay is introduced to fill the receptacle space.

9. The stator active part as claimed in claim 1, wherein recesses or positioning ribs for the rotationally-fixed positioning of the coil support are provided on or in the inner cladding of the yoke, on which or in which the coil holders of the coil support at least partially bear or engage.

10. A method for producing a stator active part as claimed in claim 1, wherein for a multiphase electric motor, comprising the following steps:

a. providing a hollow-cylindrical yoke having a receptacle space;
b. providing a coil support, which has a number of hollow-profile-shaped coil holders having a receptacle space for receiving an inlay for N/P coils per motor phase P, which coil holders protrude radially outward from the coil support;
c. wherein an SMC inlay, is introduced into the respective receptacle spaces, winding N/P finely-distributed coils per motor phase P from a winding wire;
d. installing the wound coils on the coil holders, so that the windings of the coils of each winding strand are embodied in the winding head region without winding overlap regions;
e. inserting the coil support together with the installed coils into the receptacle space of the yoke; and
f. impregnating or potting the stator active part.

11. The method as claimed in claim 10, wherein the yoke is provided on or in the inner cladding of the yoke with recesses or positioning ribs for the rotationally-fixed positioning of the coil support and the coil support having the coil holders is installed in the receptacle space of the yoke in such a way that the coil holders at least partially bear on recesses or positioning ribs or engage therein, preferably in a formfitting manner.

* * * * *